(12) United States Patent
Holl

(10) Patent No.: US 7,780,927 B2
(45) Date of Patent: Aug. 24, 2010

(54) SPINNING TUBE IN TUBE REACTORS AND THEIR METHODS OF OPERATION

(76) Inventor: Richard A Holl, 7096 Quito Ct., Camarillo, CA (US) 93012

( * ) Notice: Subject to any disclaimer, the term of this patent is extended or adjusted under 35 U.S.C. 154(b) by 177 days.

(21) Appl. No.: 12/034,533

(22) Filed: Feb. 20, 2008

(65) Prior Publication Data
US 2009/0208389 A1    Aug. 20, 2009

(51) Int. Cl.
*B01J 8/08* (2006.01)
(52) U.S. Cl. ............................ 422/209; 422/225
(58) Field of Classification Search ............... 422/135, 422/136, 209
See application file for complete search history.

(56) References Cited

U.S. PATENT DOCUMENTS

| | | | | |
|---|---|---|---|---|
| 3,471,131 A | * | 10/1969 | Fritzweiler et al. | 366/305 |
| 4,744,521 A | * | 5/1988 | Singer et al. | 241/66 |
| 6,695,705 B2 | * | 2/2004 | Stervik | 464/79 |

* cited by examiner

*Primary Examiner*—Walter D Griffin
*Assistant Examiner*—Timothy Cleveland

(57) ABSTRACT

A spinning tube in tube reactor has the usual elongated transverse annular cross section reaction passage through which reactants pass to force reaction between them; the passage being between the rotor tube exterior surface and the stator tube interior surface. The radial dimension of the annual passage should be keep as uniform as possible so as not to cause unwanted variations in the reaction. This has proven difficult in prior constructions owing to the small radial dimension (e.g. 50-300 micrometers) and inevitable manufacturing tolerances in the bearings supporting the rotor. In apparatus of the invention the rotor is suspended within the stator passage by a flexible connection between the drive motor shaft and the rotor and uniformity is maintained by the so-called hydrodynamic effect which will become operative in such a narrow passage. Thus, if any part of the rotor surface moves radially from the central position closer to the stator surface the liquid viscosity produces a force that moves the rotor back to the central position. Preferably the flexible connection consists of two serially connected flexible connectors.

14 Claims, 2 Drawing Sheets

View C - C

US 7,780,927 B2

SPINNING TUBE IN TUBE REACTORS AND THEIR METHODS OF OPERATION

FIELD OF THE INVENTION

The invention is concerned with new spinning tube in tube reactors and with new methods of operating such reactors.

BACKGROUND OF THE INVENTION

Chemical and physical reactions cannot occur until individual molecules of the reagents are brought together, and the required physical interaction is greatly facilitated as the reagents are more and more intimately mixed together. Bulk stirring is only able to cause reagent molecules to contact one another after sufficient time has elapsed to provide the necessary uniformity of inter-dispersion of the reagents, and only natural molecular diffusion can accomplish the required one on one contact, which is a very slow process. These encounters can be helped to occur by the use of reactors of small enough scale within which molecular diffusion becomes significant when at least one of its dimensions is very small. The role of the reactor, and the mixing and mass transfer equipment associated with it, is to create sufficiently small scale fluid structures or eddies in order to generate and improve the uniformity of mixing, mass transfer and molecular interdiffusion. Many different types of reactors have been proposed, and are in commercial use, and may be classified broadly as being either of natural diffusion or forced diffusion type.

There is ongoing interest in what is referred to as process intensification technology, fuelled primarily by the need to provide industrial processes that are more efficient and economical than those employed to date. Such technology is applied to any physical and/or chemical process involving heat and/or mass transfer and/or physical and/or chemical reaction, the latter term including both chemical composition and decomposition.

One type of natural diffusion type reactor that has been proposed comprises a so-called micro-mixer manufactured using methods borrowed from the electronics industry. For example, such a reactor may consist of a series of very small channels engraved or etched into a silicon wafer surface, through which the reaction components are passed together in laminar flow mode; the channels can be as small as 10 micrometers in transverse dimension. Despite the improved mass transfer obtainable, many reactions are relatively slow because they are still natural diffusion controlled, and therefore their rate depends on slow, unforced, molecular inter-diffusion.

The forced diffusion type of reactor generally involves producing on, and/or introducing to, a moving surface a thin film or its equivalent of each of the reaction components, so that interaction between them is greatly facilitated. It is also found that such interactions are possible under conditions of temperature and/or pressure that can be relatively closely controlled, especially as compared with bulk stirring. When a process component has the form of a gas, vapour, or plasma, it may be introduced to the surface in a form which is equivalent to a thin film, for example by bathing the surface in the component, or as a flow of the required thin dimension.

A more specific type of forced diffusion reactor is what is now generally known as a spinning tube in tube reactor which, as its name implies, usually comprises a first cylindrical tube, usually the rotor, mounted within a second cylindrical tube of larger diameter so as to be rotatable about a common longitudinal axis with the operative exterior surface of the rotor tube spaced radially a very small distance (e.g. 300 micrometers or less) from the cooperating operative interior surface of the stator tube. The tubes usually are of uniform diameters along their lengths and the constant radius annular space between the two cooperating surfaces constitutes a reaction passage, consequently usually of uniform radial spacing along its length, through which the reactants pass while subjected to intense shear produced by their movement through the narrow passage and by the relative rotation between the operative tube surfaces.

A major problem with such spinning tube in tube reactors and the reactions that they involve are providing adequate uniformity throughout the length of the reaction passage of the radial spacing between the operative surfaces. In the absence of such uniformity there is the possibility that different parts of the reaction passage will produce reactions operating at different rates with the possibility of producing widely different end products.

SUMMARY OF THE INVENTION

It is a principal object of this invention to provide new spinning tube in tube reactors and methods of their operation which have the ability to permit closer control of the uniformity of the radial spacing between the operative surfaces.

It is another principal object to provide new spinning tube in tube reactors and methods of their operation, in which the uniformity of the radial spacing between the operative surfaces is no longer dependent on the manufacturing tolerances of the support and drive structure for the rotor, such as the motor bearings and the bearings by which the rotor is supported.

In accordance with the invention there is provided a spinning tube in tube reactor comprising:

a first cylindrical tube constituting a stator tube having upper and lower ends;

a second cylindrical tube of smaller diameter constituting a rotor tube having corresponding upper and lower ends and disposed within the first stator tube for rotation about a common coextensive vertical longitudinal axis;

the interior surface of the stator tube being spaced a required distance from the exterior surface of the rotor tube and cooperating to provide between them a reaction passage of annular transverse cross section through which reactants are passed to react together therein while subjected to shear as a result of their passage through the reaction passage and the relative rotation of the two surfaces;

first entry means for feeding a first reactant into the reaction passage at a first entry point at the lower end thereof to pass vertically upward in the reaction passage in the form of an annular stream;

second entry means for feeding a second reactant into the reaction passage at a second entry point vertically above the first entry point to mix with the first reactant and to react therewith;

at least one of the first and second reactants being a liquid;

exit means at the upper end of the reaction passage through which reacted reactants pass from the reaction passage;

wherein motor means are disposed above the rotor and connected by a flexible connection to the upper end of the rotor to rotate it about the vertical longitudinal axis;

the flexible connection suspending the rotor within the stator, constituting sole means by which the rotor is mounted within the stator, and providing axial and angular freedom for the rotor in its rotation;

whereby uniformity of the radial spacing between the stator inner operative surface and the cooperating rotor outer operative surface around their respective circumferences is maintained by the hydrodynamic effect in the reactant liquid or liquid mixture passing upward in the reaction passage, the effect resulting from its passage and the relative rotation of the two surfaces.

Also in accordance with the invention there is provided a method of operating a spinning tube in tube reactor which reactor comprises:

a first cylindrical tube constituting a stator tube having upper and lower ends;

a second cylindrical tube of smaller diameter constituting a rotor tube having corresponding upper and lower ends and disposed within the first stator tube for rotation about a common coextensive vertical longitudinal axis;

the interior surface of the stator tube being spaced a required distance from the exterior surface of the rotor tube and cooperating to provide between them a reaction passage of annular transverse cross section through which reactants are passed to react together therein while subjected to shear as a result of their passage through the reaction passage and the relative rotation of the two surfaces;

first entry means for feeding a first reactant into the reaction passage at a first entry point at the lower end thereof to pass vertically upward in the reaction passage in the form of annular stream;

second entry means for feeding a second reactant into the reaction passage at a second entry point vertically above the first entry point to mix with the first reactant and to react therewith;

at least one of the first and second reactants being a liquid;

exit means at the upper end of the reaction passage through which reacted reactants pass from the reaction passage;

motor means disposed above the rotor and connected thereto to rotate it about the vertical longitudinal axis;

the method comprising suspending the rotor within the stator by a flexible connection between the motor means and the upper end of the rotor, the flexible connection constituting sole means by which the rotor is mounted within the stator, and providing axial and angular freedom for the rotor in its rotation;

and maintaining uniformity of the radial spacing between the stator inner operative surface and the cooperating rotor outer operative surface around their respective circumferences by an effect known in the science of tribology as the hydrodynamic lubrication or squeeze film effect in the reactant liquid or liquid mixture passing upward in the reaction passage, the effect resulting from its passage and the relative rotation of the two surfaces.

Preferably the radial dimension of the radial spacing between the cooperating stator and rotor surfaces is from 50 to 300 micrometers, and the speed of relative rotation between the cooperating stator and rotor surfaces is from 500 to 50000 rpm.

Preferably the second entry means for a second reactant feeds the reactant perpendicularly into the reaction passage in the form of a thin film thereof, and said thin film is of thickness 50-500 micrometers.

Preferably the flexible connection comprises a first flexible connector connected to the motor means and a second flexible connector connected directly in series with the first flexible connector and connected to the rotor.

DESCRIPTION OF THE DRAWINGS

An apparatus and methods that are particularly preferred embodiments of the invention will now be described, by way of example, with reference to the accompanying diagrammatic drawings, wherein.

DESCRIPTION OF THE INVENTION

Figure 1:
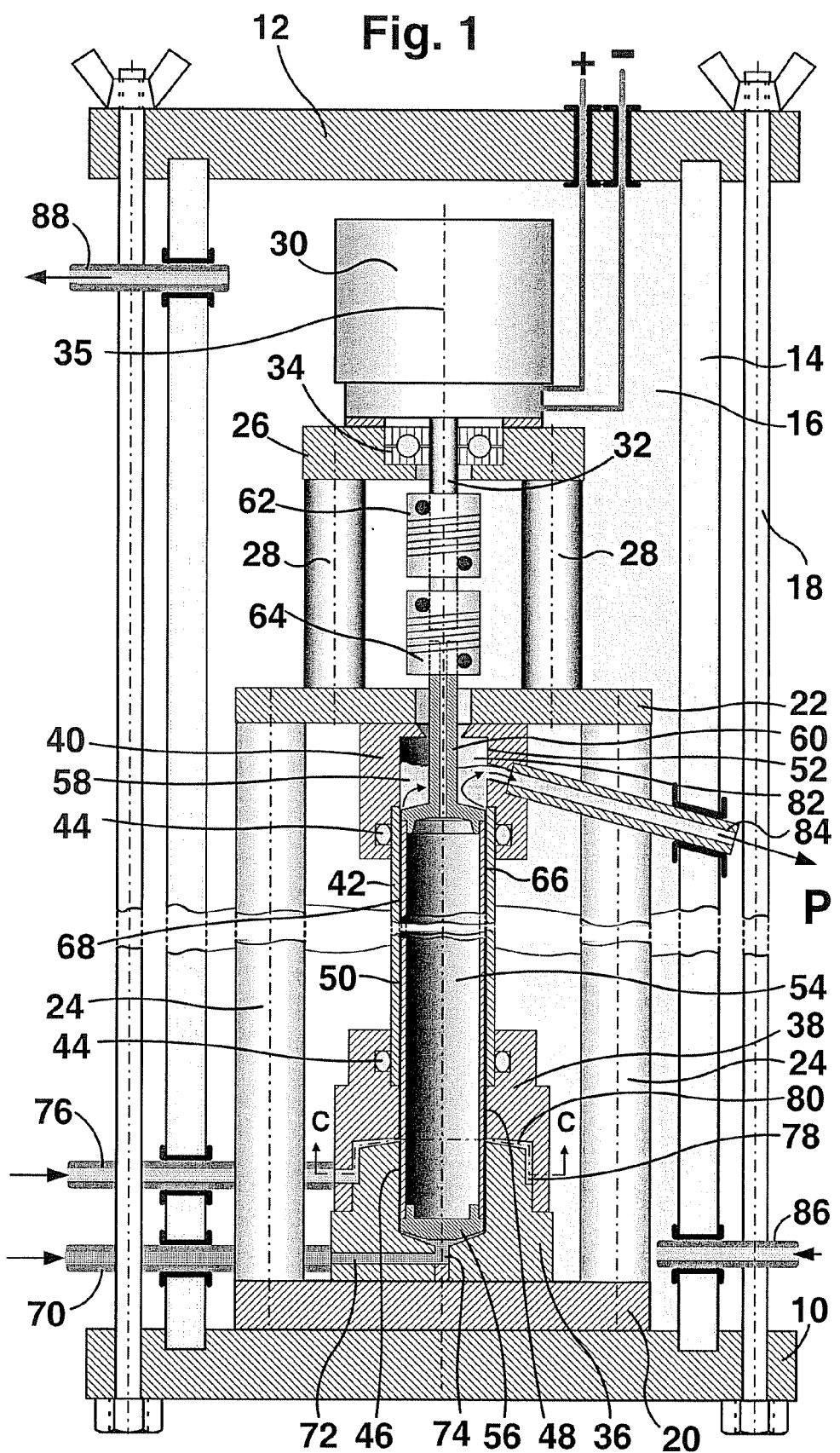
FIG. 1 is a part side elevation, part cross section through a vertical longitudinal axis, comprising a spinning tube in tube reactor, in order to illustrate its principal construction features.
Figure 2:
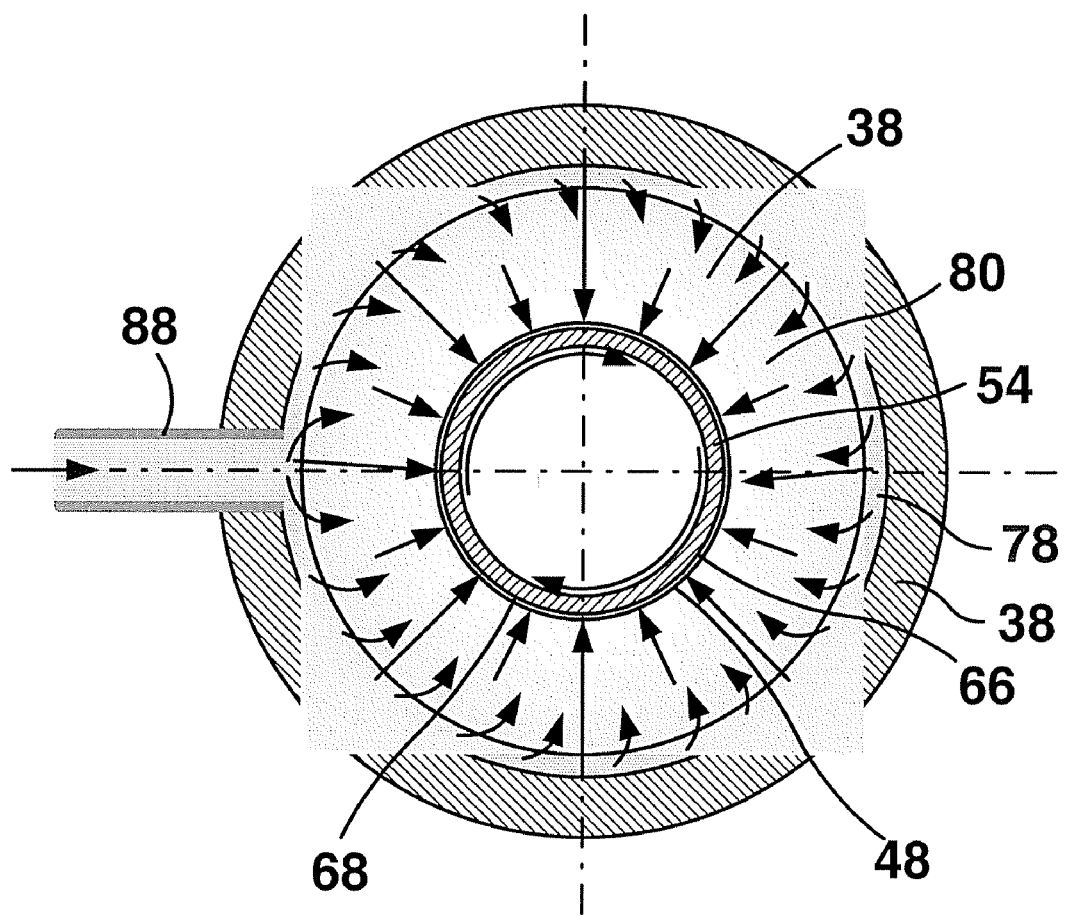
FIG. 2 is a horizontal cross section of the apparatus of FIG. 1, taken on the line C-C in FIG. 1.

The apparatus comprises a flat lower base member 10 and a spaced parallel flat upper member 12 between which is interposed an elongated cylindrical body 14, forming with the members 10 and 12 a gas-tight enclosure 16 within which the reactor is mounted and whose function will be described below. The members 10 and 12 are held in tight engagement with the respective edges of the body 14 by a number of cylindrically spaced tie-rods 18. The reactor comprises a flat bottom base plate 20 mounted on the lower base member 10, a flat intermediate plate 22 rigidly mounted on the bottom plate by vertical posts 24, and a flat motor mounting plate 26 rigidly mounted on the intermediate plate by vertical posts 28. A controllable speed electric drive motor 30 is mounted on the mounting plate 26 with its drive shaft 32 extending vertically downward through a thrust bearing 34, the length of the drive shaft being sufficient for it to extend below the mounting plate 26. The axis of rotation of the motor and its shaft is vertical and is indicated by the broken line 35. This axis 35 constitutes a common central axis of rotation for the motor shaft, the rotor and the stator. The thrust bearing ensures that the rotor cannot move vertically by its weight or operating thrust from the material in the reactor.

The reactor stator comprises an upwardly opening cup shaped base member 36 fastened to the top face of the base plate 20, an annular intermediate member 38 mounted on top of the base member 36, an annular upper member 40 mounted on the under face of the intermediate member 22 and a cylindrical tube 42 of uniform diameter along its length extending between the members 38 and 40 with its ends inserted in respective counter-bores therein. Sealing between the tube and the counter-bores into which it is inserted against gas and liquid leaks is ensured by O-rings 44. Cylindrical inside surface 46 of the cup-shaped opening in base member 36, cylindrical inside surface 48 of the intermediate member 38, cylindrical inside surface 50 of the tube 42, and cylindrical inside surface 52 of the upper member are all of the precisely the same diameter, with the respective members mounted with the surfaces being precisely aligned with one another coaxially with the axis 35, so that together they may be treated as a single continuous surface constituting the stator operative surface of a stator tube. For convenience hereinafter the stator operative surface will be referred to using the single number reference 50. The stator walls are made as thin as possible so as to make as small a heat sink as possible for when pre-heated or pre-cooled reactants are fed to the reactor.

The rotor in this embodiment comprises a thin walled tube 54 having its lower and upper ends fixed in lower and upper end members 56 and 58. The upper end member has protruding upwardly therefrom a cylindrical shaft 60 coaxial with the axis 35 and the upper end of this shaft 60 is connected to the lower end of the motor drive shaft 32 by two flexible couplings 62 and 64 connected to one another in series, whereby the rotor is suspended vertically within the stator with complete angular and axial freedom while it is rotated. Thus, these serially connected flexible couplings suspending the rotor from the motor shaft 32 constitute the sole means by which the rotor is mounted within the stator with its external cylindrical surface 66 constituting its operative surface. The inner cylindrical surface 50 of the stator tube and the outer cylindrical surface 66 of the rotor tube are coextensive with one another about the axis 35, so that an annular reaction chamber or passage 68 of small and constant radial dimension along its length is formed between them. The wall of the rotor tube is also made as thin as possible with a completely hollow interior so as to make as small a heat sink as possible for when pre-heated or pre-cooled reactants are fed to the reactor.

In this embodiment the reactor is provided with only two vertically spaced fluid entry means for respective reaction reagents, but in other embodiments more than two can be provided; usually the first reagent entry will be at the bottom end of the reaction passage with the other entry means spaced at appropriate distances upward along its length. It is important for successful operation of the invention that the reactor be operated with the axis 35 vertical and that at least one of the reagents is a liquid, and usually this will be fed into the reaction passage through the first entry means. Lower entry means for such a first reactant comprises a pipe 70 passing through a seal in the enclosure body wall 14 and connecting with a bore 72 in the lower end of the cup shaped base member 36, the bore discharging via an inlet 74 into the bottom of the cup shaped opening therein, so that reagent received from a respective supply thereof (not shown) under the action of a respective precision metering pump (also not shown) is delivered to the lower end of the reaction passage, in which it passes upward in the form of a correspondingly thin cylindrical film of uniform radial thickness.

A higher entry means for a second reactant comprises a pipe 76 also passing through a seal in the enclosure body wall 14, the pipe discharging into an annular plenum 78 that is centered on the axis 35 and is formed between the lower end of the intermediate member 38 and the upper end of the bottom member 36. The plenum feeds the second reactant into a ring shaped slit inlet 80, completely surrounding the rotor surface without a circumferential break therein, again centered on the axis 35, and again formed between the two members 36 and 38, this inlet delivering the second reagent into the reaction passage 68 in the form of a thin film thereof, whereupon together with the first reagent it is immediately subjected to the intense shear resulting from its movement within the reaction passage and the relative rotation between the stator and rotor surfaces. The slit is of very small axial dimension, e.g. of the order of 0.01-2.00 millimeters, so that the film it produces is of corresponding very small thickness dimension. The beneficial effects of such a feed system for the reagents will be described in more detail below. The mixed and reacting reactants continue upward in the reaction passage and the reacted product emerges therefrom into a reception chamber 82 in the upper member 40, from which it passes via an overflow pipe 84 to external equipment (not shown) for any further processing that is required. It will be noted that during the passage of the reactants into the reaction passage and emergence of the reaction product therefrom there is no need for seals to prevent leakage, apart from the O-rings 44.

As has been described above, it is of particular advantage for the reaction passage to be as uniform as possible in its radial dimension along its length to ensure that the reaction conditions are maintained correspondingly uniform. This has proven difficult in prior structures of which I am aware in which the rotor is mounted by bearings for its rotation within the stator, owing to the usual manufacturing tolerances associated with even the most precisely made bearings, and the increase in such tolerances over time owing to wear. Unexpectedly, it has been found possible to avoid the need entirely for such bearings and obtain the required uniformity by suspending the rotor within the stator, using a flexible coupling or couplings between it and its drive means that provide the required complete angular and axial freedom for its rotation. It is believed that this is made possible by the requirement with a spinning tube in tube reactor for the desired reaction to occur between the reactants that the radial dimension of the reaction passage is relatively small, usually of the order of 50-200 micrometers, with at this time a possible upper limit of 500 micrometers, as will be described below. Moreover, the operation of the invention is believed to be facilitated by the fact that usually the speed of relative rotation between the cooperating stator and rotor surfaces is relatively high, for example from 5 to 100,000 rpm.

It is known from tribology, the study of friction and wear of engineering materials, that when two relatively moving surfaces that conform with one another, having a thin layer of a lubricant between them, such as the operative surfaces in a journal bearing, are subjected to a load that causes them to converge, a counteracting force from the liquid wedge that has been drawn into the converging space develops and keeps the solid surfaces apart. The lubricant layer in this area is described as hydrodynamic and the phenomenon is sometimes described as the squeeze-film effect. Thus, where according to conventional theory the load should cause the surfaces to contact one another, in fact the integrity of the lubricating film is maintained and no such contact occurs. The spacing of the cooperating lubricated surfaces is of course small and it is found that the degree of convergence required between the two surfaces is quite small for the effect to occur. When it tends to occur the hydrodynamic effect of the interposed fluid is sufficient to prevent the rotor exterior surface from contacting the stator interior surface. It is believed at present therefore, although I do not intend to be limited by this explanation, that it is this hydrodynamic effect which ensures that any small divergence of the rotor from its precisely centered position within the stator produces a sufficient corresponding local hydrodynamic counter-reaction returning the rotor immediately to the centered position. The preferred range of radial dimension for the reaction passage 68 is of the order of 50-200 micrometers and this is an ideal range for the hydrodynamic effect to be obtained with reactants of the usual viscosity; with reactants of higher than usual viscosity it is believed to be possible to operate with a radial dimension as big as 300 micrometers and still obtain the desired rotor centering effect.

The entire reactor assembly, including its motor, is enclosed within the chamber 16 formed by the plates 10 and 12 and the interposed cylinder 14, which can be of transparent material to permit observation of the apparatus. The chamber is provided with an entry pipe 86 and an exit pipe 88 and can be evacuated or filled with a desired gaseous atmosphere. Many syntheses need to be carried out in the complete absence of oxygen, in which case the chamber can be filled with a relatively inert gas, such as nitrogen or argon. It is also possible to pressurize the chamber which will permit the temperature of the reagents to be raised without the possibility of boiling, avoiding the production of bubbles which would disturb the uniformity of flow in the reaction passage.

In a preferred embodiment intended primarily for prototype experimentation and determination of reaction parameters for use in commercial application the rotor tube 54 is of diameter in the range 0.5 to 50 cm, the diameter of the rotor tube of course also determining the diameter of the stator tube 42 and the associated bores in the parts 36, 38 and 40. The length of the reaction passage 68 will be in the range 5.0 to 100 cm, while the controllable drive motor 30 will be capable of rotational speeds within the range of 5 to 100,000 rpm. The flexible connectors 62 and 64 can be identical if inherently of suitable type, although in some embodiments it may be preferred to employ two different types, each having a preferred characteristic for its task of providing the desired complete axial and angular freedom of suspension. A preferred type of flexible coupling is that sold by Helical Products Co. of Santa Maria, Calif., comprising a metal helix interposed between two end members by which it is coupled to a drive shaft.

The apparatus of the invention provides very high rates of uniform micro-mixing, so that complete mixing can be obtained within a very short axial distance from the point of entry of a reactant material into the reaction passage. For example, it is possible to achieve such uniform mixing within a period of less than 5 milliseconds during which the mixing reagents have moved a distance of less than 5 mm (0.2 in). Thereafter, the already uniformly interspersed reactants are subjected to intense, forced, molecular inter-diffusion caused by the high shear rates obtained by the high speed rotation of rotor surface 66 on one side of the flow against the stator parallel surface 50 on the other side. Typical shear rates obtainable at the radial dimensions employed are between 5,000 and 500,000 $sec^{-1}$. It is important that the uniformly parallel spacing of the shearing surfaces permits only highly sheared, thin films and that tank-like macro-agitation is made impossible. The fact that high speed, uniform, forced, molecular inter-diffusion of the reactant fluid molecules takes place can be verified by examining various chemical reactions performed in the reactor, which typically will be found to occur over 100 to several 1,000 times faster than in a conventional stirred tank and several times to several 100 times faster than in micro-reactors. The resultant product may be a liquid, a suspension of fine solids in a liquid, or a gas mixed with a liquid.

The prior methods of achieving high mass transfer and accelerated chemical reaction kinetics, generally suffer from the inability to effect continuous, high-speed, uniform and forced inter-diffusion of reactant molecules on a sub-micron and nanometer scale. Even with improved mass transfer many reactions are still natural diffusion controlled and therefore their rate depends on slow, "non-forced," molecular inter-diffusion. In addition, it is believed that achievement of fast inter-diffusion is hampered significantly by the diffusion retarding preponderance of what may be termed molecular clusters or swarms, inherently occurring in liquids or gases, within which clusters or swarms the molecules are anisotropically ordered from a kinematic point of view, such ordering impeding rapid, natural interdiffusion. In a publication entitled Kinetic Theory of Liquids, published by Oxford University Press, First Edition 1946, p. 304, the author Jacob Frenkel refers to these clusters as molecular "swarms." According to Frenkel, these swarms usually have linear dimensions of the order of <100 nm, while the orientation of the molecules within the same swarm can gradually change from point to point However, when these clustered liquids are forced to flow at high speed through very narrow, unidirectional and uniform shear fields, such as those provided by the apparatus of the invention, the molecular clusters break up and greatly facilitate unclustered, individual reactant molecules to encounter each other on a one on one basis and thereby permit very rapid and efficient reactions to take place. In an ideal reaction, not just the surface molecules of reactant clusters react, slowly removing layer after layer of molecules from the cluster bodies, but all reactant molecules meet one on one as quickly as possible and in proper orientation to one another being no longer ordered within clusters.

INDEX OF REFERENCE NUMERALS

10. Flat lower base member
12. Flat upper member
14. Elongated cylindrical body
16. Gas-tight enclosure
18. Tie rods connecting 10 and 12
20. Flat bottom base plate
22. Flat intermediate plate
24. Vertical posts between plates 20 and 22
26. Flat motor mounting plate
28. Vertical posts between plates 22 and 26
30. Electric drive motor
32. Motor drive shaft
34. Thrust bearing
35. Common vertical axis of rotation
36. Cup shaped stator base member
38. Annular stator intermediate member
40. Annular stator upper member
42. Stator cylindrical tube
44. O-rings between tube and members 38 and 40
46. Cylindrical inside surface of base member 36
48. Cylindrical inside surface of intermediate member 38
50. Cylindrical inside surface of tube 42
52. Cylindrical inside surface of upper member 40
54. Rotor cylindrical tube
56. Rotor lower end member
58. Rotor upper end member
60. Rotor upper end drive shaft
62. Upper serially connected flexible connection
64. Lower serially connected flexible connection
66. Rotor external cylindrical operative surface
68. Annular reaction passage between surfaces 66 and 46-52
70. Entry pipe for first reactant
72. Entry bore from pipe 70 into member 36
74. Inlet into reaction passage 68 from bore 72
76. Entry pipe for second reactant
78. Annular entry plenum between members 36 and 38
80. Bottom surface of ring shaped slit inlet from plenum 78 to reaction passage 68
82. Reception chamber for product at upper end of reaction passage 68
84. Outlet overflow pipe from reception chamber 82
86. Inlet pipe to enclosure 16
88. Outlet pipe from enclosure 16

I claim:
1. A spinning tube in tube reactor comprising:
a stator including first cylindrical tube constituting a stator tube having upper and lower ends and an interior cylindrical operative surface;
a rotor including a second cylindrical tube of smaller diameter constituting a rotor tube having corresponding upper and lower ends and an exterior cylindrical operative surface and disposed within the stator tube for rotation about a common coextensive vertical longitudinal axis;
the interior surface of the stator tube being spaced a required distance from the exterior surface of the rotor tube and cooperating to provide between them a reaction passage of annular transverse cross section through which reactants are passed to react together therein while subjected to shear as a result of their passage through the reaction passage and the relative rotation of the two surfaces;

first entry means for feeding a first reactant into the reaction passage at a first entry point at the lower end thereof to pass vertically upward in the reaction passage in the form of an annular stream;

second entry means for feeding a second reactant into the reaction passage at a second entry point vertically above the first entry point to mix with the first reactant and to react therewith;

at least one of the first and second reactants being a liquid;

exit means at the upper end of the reaction passage through which reacted reactants pass from the reaction passage;

wherein motor means are disposed above the rotor and are connected by a flexible connection to the upper end of the rotor to rotate it about the vertical longitudinal axis;

the flexible connection suspending the rotor within the stator, constituting sole means by which the rotor is mounted within the stator, and providing axial and angular freedom for the rotor in its rotation;

whereby uniformity of the radial spacing between the stator inner operative surface and the cooperating rotor outer operative surface around their respective circumferences is maintained by the hydrodynamic effect in the reactant liquid or liquid mixture passing upward in the reaction passage, the effect resulting from its passage and the relative rotation of the two surfaces.

2. A reactor as claimed in claim 1, wherein the dimension of the radial spacing between the cooperating stator and rotor surfaces is from 50 to 500 micrometers.

3. A reactor as claimed in claim 1, wherein the speed of relative rotation between the cooperating stator and rotor surfaces is from 5 to 100,000 rpm.

4. A reactor as claimed in claim 1, wherein the second entry means for a second reactant feeds the reactant into the reaction passage in the form of a thin film thereof.

5. A reactor as claimed in claim 4, wherein the thin film is of thickness 50-500 micrometers.

6. A reactor as claimed in claim 1, wherein the flexible connection comprises a first flexible connector connected to the motor means and a second flexible connector connected directly in series with the first flexible connector and the rotor.

7. A method of operating a spinning tube in tube reactor, which reactor comprises:

a stator including a first cylindrical tube constituting a stator tube having upper and lower ends and an interior cylindrical operative surface;

a rotor including second cylindrical tube of smaller diameter constituting a rotor tube having corresponding upper and lower ends and an exterior cylindrical operative surface and disposed within the stator tube for rotation about a common coextensive vertical longitudinal axis;

the interior surface of the stator tube being spaced a required distance from the exterior surface of the rotor tube and cooperating to provide between them a reaction passage of annular transverse cross section through which reactants are passed to react together therein while subjected to shear as a result of their passage through the reaction passage and the relative rotation of the two surfaces;

first entry means for feeding a first reactant into the reaction passage at a first entry point at the lower end thereof to pass vertically upward in the reaction passage in the form of an annular stream;

second entry means for feeding a second reactant into the reaction passage at a second entry point vertically above the first entry point to mix with the first reactant and to react therewith;

at least one of the first and second reactants being a liquid;

exit means at the upper end of the reaction passage through which reacted reactants pass from the reaction passage; wherein motor means are disposed above the rotor and are connected thereto to rotate it about the vertical longitudinal axis; and the method comprising suspending the rotor within the stator by a flexible connection between the motor means and the upper end of the rotor, the flexible connection constituting sole means by which the rotor is mounted within the stator, and providing axial and angular freedom for the rotor in its rotation;

and maintaining uniformity of the radial spacing between the stator inner operative surface and the cooperating rotor outer operative surface around their respective circumferences by the hydrodynamic effect in the reactant liquid or liquid mixture passing upward in the reaction passage, the effect resulting from its passage and the relative rotation of the two surfaces.

8. A method as claimed in claim 7, wherein the dimension of the radial spacing between the cooperating stator and rotor surfaces is from 50 to 500 micrometers.

9. A method as claimed in claim 7, wherein the speed of relative rotation between the cooperating stator and rotor surfaces is from 5 to 100,000 rpm.

10. A method as claimed in claim 7, wherein the second entry means for a second reactant feeds the reactant perpendicularly into the reaction passage in the form of a thin film thereof.

11. A method as claimed in claim 10, wherein the thin film is of thickness 50-500 micrometers.

12. A method as claimed claim 7, wherein the flexible connection comprises a first flexible connector connected to the motor means and a second flexible connector connected directly in series with the first flexible connector and the rotor.

13. A reactor as claimed in claim 1, wherein the reactor is enclosed within a gas-tight enclosure.

14. A method as claimed in claim 7, wherein the reactor is enclosed in a gas-tight enclosure.

* * * * *